W. G. PANCOAST AND W. J. GROTENHUIS.
BUMPER
APPLICATION FILED JUNE 13, 1919.
1,374,893.
Patented Apr. 12, 1921.
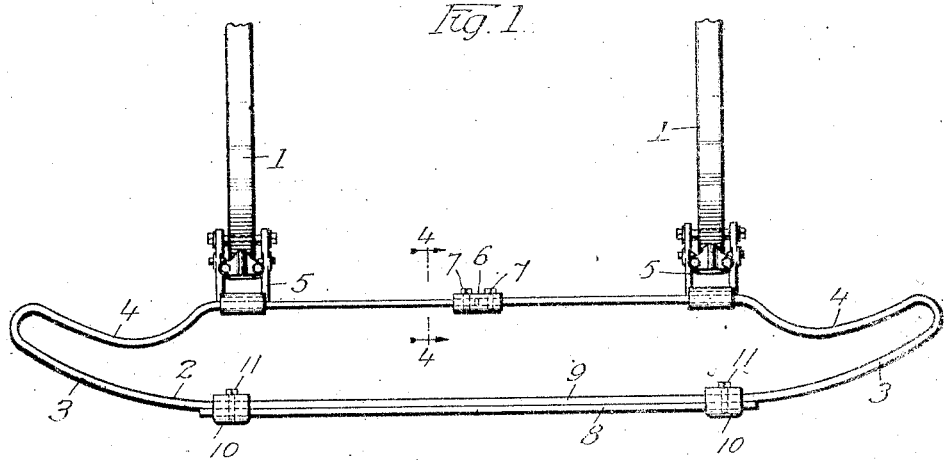
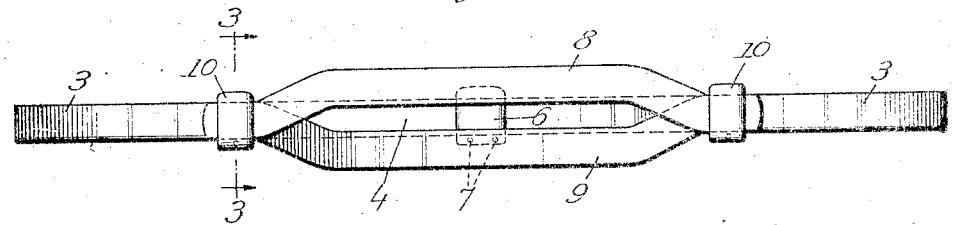
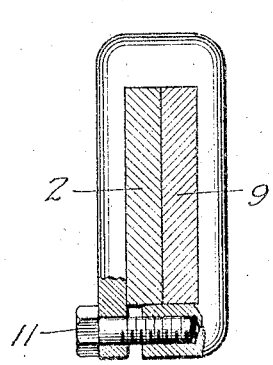
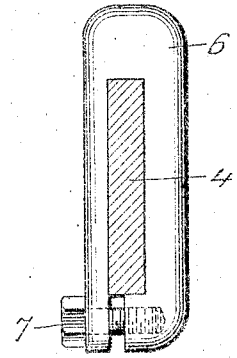

UNITED STATES PATENT OFFICE.

WILLIAM G. PANCOAST AND WILLIAM J. GROTENHUIS, OF CHICAGO, ILLINOIS, ASSIGNORS, BY MESNE ASSIGNMENTS, TO AMERICAN CHAIN COMPANY, INC., A CORPORATION OF NEW YORK.

BUMPER.

1,374,893.  Specification of Letters Patent.  Patented Apr. 12, 1921.

Application filed June 13, 1919. Serial No. 303,919.

*To all whom it may concern:*

Be it known that we, WILLIAM G. PANCOAST and WILLIAM J. GROTENHUIS, both citizens of the United States, and both residents of Chicago, in the county of Cook and State of Illinois, have invented certain new and useful Improvements in Bumpers, of which the following is a specification.

Our invention has reference more particularly to bumpers of the type which are used on automobiles either at the front or rear end to receive and absorb the shock of impact in case of collision and prevent damage to the automobile.

The bumpers which are usually provided for automobiles comprise a plate or bar which is mounted transversely in a fixed vertical position at the front or rear end of the automobile and these bumpers of narrow width so that obstructions projecting above or below the bumper may avoid the latter and reach and damage the automobile in case of collision, bumpers of this type, because of their narrow vertical width, thus affording only a limited protection to the automobile on which they are attached.

The principal objects of our invention are to provide a bumper of increased vertical width so as to afford a greater degree of protection to automobiles and vehicles than bumpers heretofore provided; to provide a bumper having a vertically expanded impact face to more completely guard the car to which it is attached; to provide a bumper having a vertically offset impact portion intermediate of its ends and a reversely offset member connected therewith to prevent obstructions reaching over or under the bumper in case of collision and coming into contact with the car; to provide a flat plate bumper having a vertically offset portion intermediate its ends and a reversely offset portion clamped thereto in a substantial manner to provide an impact structure of increased vertical width to more adequately protect the car than bumpers heretofore provided; and in general to provide an improved bumper of simple construction affording a high degree of protection to the car upon which it is mounted.

On the drawings—

Figure 1 is a top view of our improved bumper with fragmentary portions of automobile or vehicle sills to which it is attached;

Fig. 2 is a front view thereof;

Fig. 3 is a vertical sectional view on the line 3—3, Fig. 2, and

Fig. 4 is a similar view on the line 4—4, Fig. 1.

The reference numeral 1 indicates end portions of the sills of an automobile or any other vehicle to which the bumper is to be attached, the bumper, of course, being intended for attachment to either the front or rear end of the vehicle. The bumper comprises a long plate or flat bar 2 of spring material which extends entirely across the end of the vehicle and has the ends bent rearwardly at 3 and provided with inturned portions 4 at each end which are connected by brackets 5 to the ends of the sills 1. The plate or bar 2 is made of spring material so as to yield in case of impact with a resistant object and the inturned ends 4 afford an end connection which permits a high degree of resiliency. The inturned ends 4 are preferably extended inwardly beyond their connection with the brackets 5 so that the inner ends come close together, and the two ends are embraced in the clamp 6 which is constructed, as shown in Fig. 4, to receive the ends of the bar 2 therein and has the cap screws 7 arranged to secure the ends of the bumper bar firmly in the clamp.

In order to provide increased vertical width to avoid projections or obstructions reaching over or under the bumper, the bumper bar 2 is vertically arched at 9 a suitable distance across the width of the vehicle and there is a bar 8 which is similarly arched and reversely arranged, as shown in Fig. 2, and has its ends clamped at each end of the arched portion 9 of the bar 2 by means of clamps 10.

These clamps are similar to the clamp 6, but instead of having the two connected parts arranged end to end as in the former construction, are provided with an aperture of double width, as shown in Fig. 3, to receive the bar 2 and the end of the bar 9 overlapped therein. The lower separated ends of the clamp are drawn together by a cap screw 11 so as to clamp the overlapped portions of the bars 8 and 9 firmly together. The brackets 5 may be of any suitable construction which enables the bumper to be securely fastened to the ends of the sills 1, these brackets being usually arranged to clamp onto the end of the sill or are secured in place by utilizing the bolt commonly employed for fastening the spring to the end of the sill. Any type of bracket may be employed which is capable of having the bumper secured thereto.

While we have shown and described our invention in a preferred form we are aware that various changes and modifications may be made therein without departing from the principles of our invention. For example, while we prefer the flat bar bumper structure as it affords a very satisfactory bumper of great resiliency and lends itself readily to the application of our invention, other types of bumpers may readily be made employing our invention. Also, the bumper may be made in two lateral half sections, one of which has the upwardly arched portion 8 and the other of which has the downwardly arched portion 9 which may be clamped together in a manner similar to the connection of the auxiliary bar 8 in the structure disclosed. Our invention, therefore, is not intended to be limited to the particular construction shown and described but we contemplate such changes and modifications as may be included in the appended claims.

We claim as follows:

1. A bar bumper comprising a flexible impact member provided with lateral end portions of substantially the vertical width of the bar and having near the middle of the bar a portion of substantially increased impact area.

2. A bumper comprising a transversely extending impact bar provided with lateral end portions of substantially the vertical width of the bar and provided near the middle of the bar with a vertically offset portion forming an impact surface of increased area.

3. A bumper comprising a flexible impact bar adapted for extension transversely of the end of an automobile, said bar being provided with relatively narrow impact areas extending from the lateral ends of said bar toward the middle thereof and with a relatively widened impact area near the middle of the bar.

4. A bumper comprising a transverse impact bar presenting relatively narrow impact areas at and near its lateral ends and provided near its middle, with a vertically-widened impact area extending above the horizontal plane of the lateral ends of the bar.

5. A bumper comprising a transverse impact bar having lateral ends of substantially the vertical width of the bar, and having, near the middle of the bar, vertically-offset portions including a portion extending upwardly and in front of the radiator of an automobile.

6. A motor vehicle bumper comprising an impact member provided with end sections adapted to be attached to the vehicle and an intermediate impact section of increased area near the middle of the impact member.

7. A motor vehicle bumper comprising an impact member provided with end sections adapted for connecting the impact member to the vehicle and provided intermediate said ends, with a vertically-offset portion.

8. A bumper for motor vehicle comprising a transverse impact bar having end sections adapted for connecting the bar to the vehicle and having intermediate its ends vertically spaced portions, one of said portions being offset from the end portions of said bar.

9. A motor vehicle bumper comprising an impact section consisting of parallel members spaced apart vertically near the middle of the bumper, and provided with narrower end sections adapted for attachment to the vehicle frame.

10. A motor vehicle bumper comprising end sections adapted to be attached to the vehicle frame, and an intermediate impact section consisting of parallel members spaced apart vertically and connected with said end sections.

11. A motor vehicle bumper comprising end sections adapted to be attached to the vehicle frame, and an intermediate impact section extending between said end sections and consisting of parallel members spaced apart vertically in position above and below said end sections.

12. In a bumper extending transversely of the end of an automobile, the combination with an impact bar, of a vertically offset auxiliary bar secured thereto and of less lateral extent than said impact bar.

13. In a bumper extending transversely of the end of an automobile, the combination with an impact bar, of an auxiliary bar secured thereto and of less lateral extent than said impact bar and extending into planes above the plane of the ends of the impact bar.

14. In a bumper extending transversely of the end of an automobile the combination with an impact bar, of a vertically offset auxiliary bar having its ends secured to the impact bar intermediate the ends of said impact bar.

15. In a bumper extending transversely of the end of an automobile the combination with an impact bar, of an auxiliary bar secured thereto and having portions vertically offset therefrom, part of the auxiliary bar extending generally parallel to said impact bar.

16. An attachment for an automobile bumper having a single impact bar, comprising an auxiliary bar adapted to be attached at its ends to said impact bar and having its intermediate portion vertically offset from said ends.

17. An attachment for an automobile bumper having a single impact bar, comprising an auxiliary bar adapted for attachment intermediate the ends of said impact bar and provided with end portions having flat contact surfaces adapted for engagement with said impact bar, said auxiliary bar being provided with an intermediate portion vertically offset from said end portions.

18. An attachment for an automobile bumper having an impact bar, comprising a relatively short vertically-offset auxiliary bar adapted to be detachably connected to said impact bar, substantially as described.

19. An attachment for an automobile bumper having an impact bar, comprising an auxiliary bar of less length than said impact bar and having a vertically-offset portion and adapted to be attached to the impact bar between its ends.

20. An attachment for an automobile bumper having an impact bar, comprising a relatively short auxiliary bar having a vertically-offset portion and adapted to be attached to the impact bar and to extend above the same.

21. In a bumper, the combination of a transverse bar having the ends folded rearwardly and inwardly and secured together at their inner ends to resiliently support the transverse bar, spaced clamps secured to and supporting the inturned ends of the transverse bar, said bar being provided with a vertically offset portion intermediate of the inturned ends, a corresponding reversely offset auxiliary bar, and clamps for securing the ends of the auxiliary bar to the transverse bar.

22. In a bumper, the combination of a transverse impact member comprising elongated flat plate members, means for securing the plate members together comprising an integral U-shaped clamp having arms engaging flat faces of the bar and extending therebeyond, and a threaded member engaging the extended ends of the U-shaped member to clamp the arms against the flat faces of the bar.

In witness whereof, we have hereunto subscribed our names this 10th day of June, A. D., 1919.

WILLIAM G. PANCOAST.
WILLIAM J. GROTENHUIS.